Oct. 10, 1967 H. WEHRIG 3,346,850

INPUT CIRCUIT FOR DATA PROCESSING UNIT

Filed June 1, 1964

Inventor:
Helmut Wehrig
By: Spencer & Kaye
ATTORNEYS

United States Patent Office 3,346,850
Patented Oct. 10, 1967

3,346,850

INPUT CIRCUIT FOR DATA PROCESSING UNIT

Helmut Wehrig, Bad Hersfeld, Germany, assignor to Zuse K.G., Bad Hersfeld, Germany Filed June 1, 1964, Ser. No. 371,495
Claims priority, application Germany, June 1, 1963, Z 10,155
17 Claims. (Cl. 340—172.5)

ABSTRACT OF THE DISCLOSURE

A mask register which has one digital position corresponding to each character of a punched card is used in transferring data from a card reader to the input of a data processing unit. The card characters are stored in a buffer storage unit and are serially shifted into the input of the data processing unit through a coding unit which translates the characters into the appropriate code. The contents of the mask register are shifted in synchronism with the character transmission, the last two positions of the mask register being examined by a logic circuit to determine whether the character being transmitted is a number or a letter and to distinguish word boundaries between the transmitted characters.

*Specification*

The present invention relates to an arrangement for transmitting data, in a manner suitable for processing such data, from a punched card or magnetic card read-out device, i.e., a reader by means of which the information appearing on punched cards or magnetic cards is sensed and converted into electrical pulses, to a data processing unit, and/or to an arrangement for transmitting data from a data processing unit to a write-in device, i.e., a writer by means of which information is written mechanically into a card or a card punch which provides the card with the perforations positioned in accordance with the information. The data on the cards consists of a plurality of so-called concepts or information words and each word consists of a plurality of characters, i.e., numbers or letters, the characters being transmitted serially.

Coding processes are generally used whenever information is transmitted between the punched card or magnetic card and a data processing system, i.e., whenever information is to be transmitted from the system to the card or vice versa. That is to say, when information is to be transferred from the card to the data processing machine, the code in which the information appears on the card has to be converted to the code of the machine, and, conversely, the machine code has to be converted to the code of the card whenever information is to be put out by the machine.

If, for example, punched cards are processed by both the reader and the writer in a line-by-line manner, the information on the card can, during the reading-in, be reproduced directly in the working storage of the data processing unit. For example, in the case of an 80-position punched card having a storage matrix of $12\times80=960$ bits, the working storage will retain a binary 1 at those places where the corresponding points on the card are perforated. During a subsequent decoding process, the information of each program is changed from the punched card code to the machine code. The same thing happens during read-out, i.e., when information in the output storage of the machine is to be transferred onto a punched card. One drawback of this is that the arithmetic unit is blocked during the entire read-in time of the punched card; another drawback is that more time is lost as the result of the coding process.

It has been sought to overcome the above disadvantages by providing a buffer storage which receives the information contained in the card, which information is then transferred, column-by-column, into the data processing unit. Either a program or a fixed coder is used to change the contents of the buffer storage into the machine code of the data processing system. But in the case of data processing systems working with words of fixed length, the use of buffer storage brings with it a further problem, which will now be more fully explained in conjunction with punched cards.

When the buffer storage feeds the information column-by-column into the computer, the characters, which have now been encoded into the machine code, are generally distributed among the storage cells of the unit in the sequence in which the characters arrive. Consider, by way of example, a computer which is capable of storing, in each storage cell (containing one word) ten decimal places D1 to D10 and a further place V for the algebraic or other identifying sign of the word.

Assuming that each character digit, i.e., each column of the card, has sufficient bits to enable a decimal number as well as a letter to be represented, the first ten characters coming from the punched card buffer storage would be stored in the first word, the next ten in the second word, and so on. But since the information carried by the punched card is, in most cases, not divided into ten-digit words, the individual words on the card (e.g., address, article number, price, and so on) are distributed in direct sequence among the individual words in the computer. Therefore, if the computer is to process the read-in punched card information, each program has to include a splitting or rearrangement which, it will be appreciated, increases the time it takes to process the information.

Other difficulties arise if the data processing system operates with a so-called pseudo-alphameric code. A pseudo-alphameric code stores a number in each place. If, however, text is produced, the places of two numbers are used for representing a letter. By way of example: The above-mentioned data processing system is able to store ten decimal places and one identifying sign. Each decimal place can store one number encoded in the excess-three code (using four bits). Two number places are used if letters or other special characters (e.g., $, %, &) are to be stored in the word cell. The identifying sign of the word then shows that this word is to be considered as a five-letter text and not as a ten-digit number.

If, then, a computer is to take both text and numbers from a card, two groups of four (for one letter) and a further group of four (for one number) have to be transmitted to the computer. But since any one word in the computer may contain both text symbols and number symbols, there is the additional difficulty of selecting an identifying sign for the word. Another problem that arises is that of how, in the storage of the computer, to account for the non-perforated columns of the card. The non-perforated columns on the card appear either as text words or as number words. It would, therefore, be necessary either to leave free two places, or one place in the word of the working storage of the system. But this is in many cases impossible because, due to the automatic reading-in via the coder, there is no way in which such a distinction can be made.

It is, therefore, the primary object of the present invention to provide a way in which the above drawbacks are overcome, namely, to provide a system which has a high effective data processing rate, this being achieved by letting the data processing take place during operation of the card reading and writing. To this end, buffer storages are used for the reading in and writing out of punched cards. The information is fed into the computer, or taken out therefrom, in a column-by-column manner. This takes place at high internal speeds, so that the input and output processes which block the data processing system are of exceedingly short duration.

With the above objects in view, the present invention resides, mainly, in an arrangement for transmitting data, in a manner suitable for processing such data, from a card reader to a data processing unit, or from such a unit to a card writer, wherein each card—which will, in practice, generally be a punched card or a card on which the information is stored magnetically, although other types of card storage may be involved—is divided into a plurality of regions each of which is capable of storing one information word each of which words consists of a plurality of characters which are transmitted serially. According to the present invention, a mask register is provided which has as many digital positions as the card has characters, this mask register being read out in synchronism with the transmission of characters. Also, means are provided for analyzing one or more consecutive digital positions of the mask register for identifying a word boundary between two characters.

The analyzing means may include means for distinguishing between words which are to be processed by the data processing unit from words which are not to be processed. The unit itself may include a storage having a plurality of cells, there being means for feeding the mask register from a cell which is determined by the first transmitted character or the first ones of the transmitted characters. In practice, each position of the mask register may be a binary digital position, two word boundaries will be spaced from each other by at least two characters, and the analyzing means include means for applying "word boundary" and "word is not to be processed" signals, as will be described more fully below. Also, means may be provided which are operative upon the appearance of a signal "word boundary" for causing the address of the storage cell of the data processing unit being treated to be changed, especially by being increased by one unit, as well as means operative during the reading-in of a card into the unit and depending upon the "word is not to be processed" signal for causing an identifying character to be applied to an identifying position of the storage cell being treated and for filling free storage places in the cell with dummies after the appearance of the word boundary. The card reader or writer may include a buffer storage for temporarily storing the contents of the card, a coder and/or a code tester, and the mask register may be a part of the storage of the data processing unit.

Additional objects and advantages of the present invention will become apparent upon consideration of the following description when taken in conjunction with the accompanying drawings in which.

Figure 1:
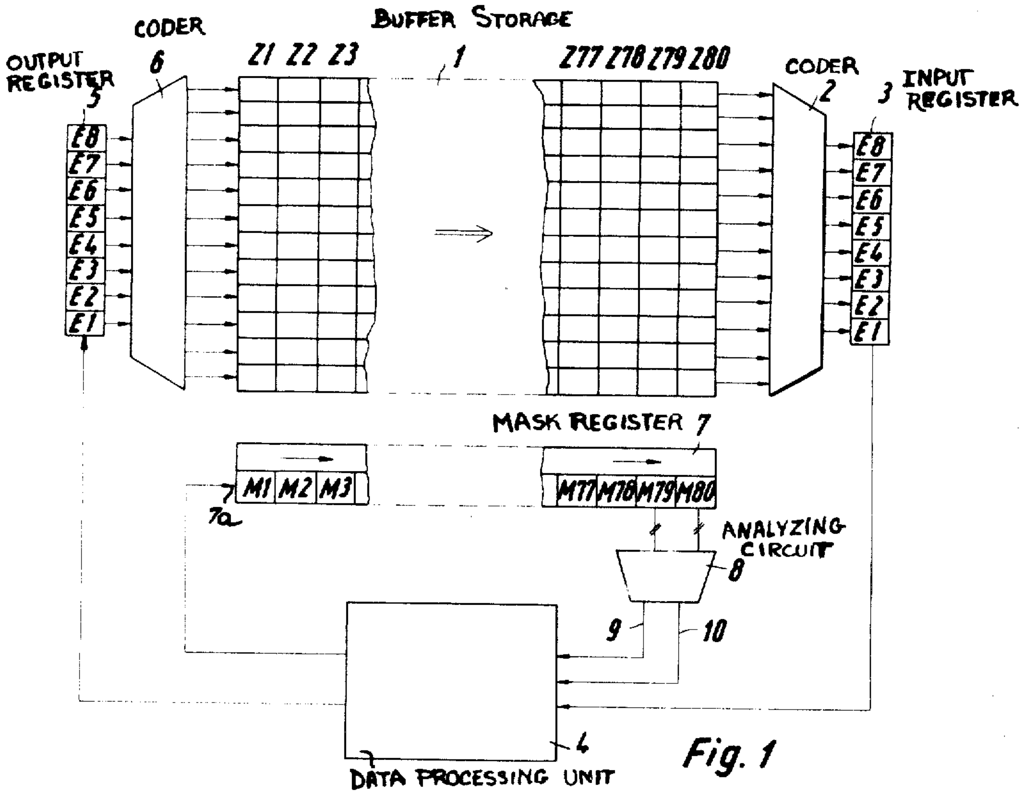
FIGURE 1 is a block diagram of one embodiment of a circuit arrangement according to the present invention.

Referring now to the drawings, FIGURE 1 thereof shows the transmission of data from a punched card, which is punched in conventional punched card code, to a data processing unit in which decimal numbers are encoded, in tetrads, in the above-mentioned excess-three code, two tetrads being required for representing letters (this being the so-called pseudo-alphameric representation). The excess-three code is a coded decimal notation for decimal digits which represents each decimal digit as the corresponding binary number plus three, e.g., the decimal digits 0, 1, 7 and 9, are represented as 0011, 0100, 1010 and 1100, respectively. In this notation, the nines-complement of the decimal digit is equal to the ones-complement of the corresponding four binary digits.

FIGURE 1 shows a buffer storage 1 having 80 columns and 12 lines. This storage is filled, column-by-column or line-by-line, depending on the particular reader which is being used. The reader and the connections between the reader and the buffer storage are not illustrated. The information is then read into an input register 3 via a coder 2, the latter being a device which changes the code in which the information appears on the card into the computer code. This read-in takes place column-by-column, i.e., character-by-character. The contents of register 3 is then passed on to the data processing unit 4.

Information put out by the unit 4, for purposes of punching a new card, is applied to an output register 5, whose contents, in turn, is applied to a coder 6 which converts the code of the machine to the code of the card. The output coder 6 is applied either to the same buffer storage 1 described above, or to a different buffer storage.

According to the present invention, the information input as well as the information output is controlled by so-called "masks," and the principle underlying this control will now be explained in conjunction with a punched card input.

Each character Z1 to Z80, that is to say, each column of the buffer storage, has one digital position, preferably a binary digital position, M1 to M80, of a so-called mask register 7 assigned to it. This mask register is filled, by the unit 4 and in accordance with the program, at the start of the read-in of the buffer storage. The last positions of the mask register, M79 and M80, are considered as test positions and cause the information from the buffer storage 1 to be read into the unit 4 in a manner suitable for processing, via an analyzing circuit 8. The contents of the buffer storage is here moved "rightwardly" together with contents of the mask register 7. The input occurs as follows:

The contents of column Z80 of the buffer storage 1 is first applied to the input register 3 via the coder 2. A determination is made at the test places of the mask register 7 as to whether the character represented by this information is a number or a textual character. If the determination made at the test positions shows that what is involved is a number necessary for the data processing (and not a number in the text, e.g., a house number or a text letter), the unit 4 will, in the next step, take over only the positions E1 to E4 in which the read number of the excess-three code is to appear. The positions E5 to E8 are not considered when numbers are involved. After the positions E1 to E4 have been taken over, the input register is completely reset. The position Z79 is now read out which, as a result of the shifting of the contents of the buffer storage, reaches the position Z80. At the same time, a pulse is applied to a shifting input 7a of the mask register so as to shift the contents of the mask register rightwardly by one position, so that now the original positions M78 and M79 will be tested. If it is now determined, at these test positions, that a number is once again involved, only the positions E1 to E4 of the input register will be taken out, and so on. In this way, numbers will reach the storage of the unit 4 without there being any gaps; there they will appear exactly as they are to be processed later.

If, in contradistinction to what is described above, text characters, including textual numbers, are involved, the test positions will cause the positions E1 to E8 to be transferred to the input register. Thus, text numbers, always separated by a "0"-tetrad, will reach the storage of the computer since they are not to be subjected to any computation, whereas letters reach the storage in the unit 4 in place of two number positions. This process continues until a so-called "word boundary" or end brings about a separation of the information.

These word boundaries are, in accordance with the present invention, likewise determined by the contents of the mask register so that upon a change of card type, i.e., the separation of the words on a card, only the contents of this mask register has to be changed. If each card is additionally provided with a marker which refers to a plurality of masks, a stack of cards containing cards of different types can readily be processed. The mask register must then simply be correctly read in dependence on the characters which are transmitted first.

The circuit 8 serves to analyze the contents of the mask register with respect to the type of data (number or letter) as well as with respect to the word boundary. The inputs of the circuit 8 are connected to the last two mask register positions M79 and M80 which, at any given time, are available for transmission and which pertain to the next following character of the buffer storage. The circuit 8 has two outputs 9 and 10; the output 9 tells the unit 4 when there is a word boundary between two transmitted signals. The data on a card, after having been read into the storage cells of the unit 4, should, in accordance with the present invention, be so arranged that only one word is stored in each cell.

The signal "word boundary" coming from output 9 acts on the unit 4 during the input process such that the remaining positions of a storage cell, which itself is but partly filled by one complete word, are now filled with dummies, e.g., zeros, and that a new storage cell is made ready for taking over the next word.

In the illustrated embodiment, the mask register has, in addition to characterizing the word boundaries, the further function of selecting and identifying the words which are to be processed. If, by way of example, the data processing involves a bookkeeping operation, the account number of a client remains the same but the balance in the account of this customer will change from entry to entry, and only this balance is to be processed. If the single mask register is to carry out this combination of functions, the minimum number of symbols per information word is, by convention, fixed at two. Therefore, the analyzing circuit 8 will operate in accordance with the following rules:

(1) Apply the signal "word boundary" (signal at output 9) when no word boundary was determined at the last preceding character and when the mask register element M80 pertaining to the character which is just to be transmitted is of the opposite state as the immediately following element M79.

(2) Apply the signal "word is not processed" (signal at output 10) when the second character or a character following a word boundary has a given binary state (here 1) representing the input of textual and special characters.

Figure 2:
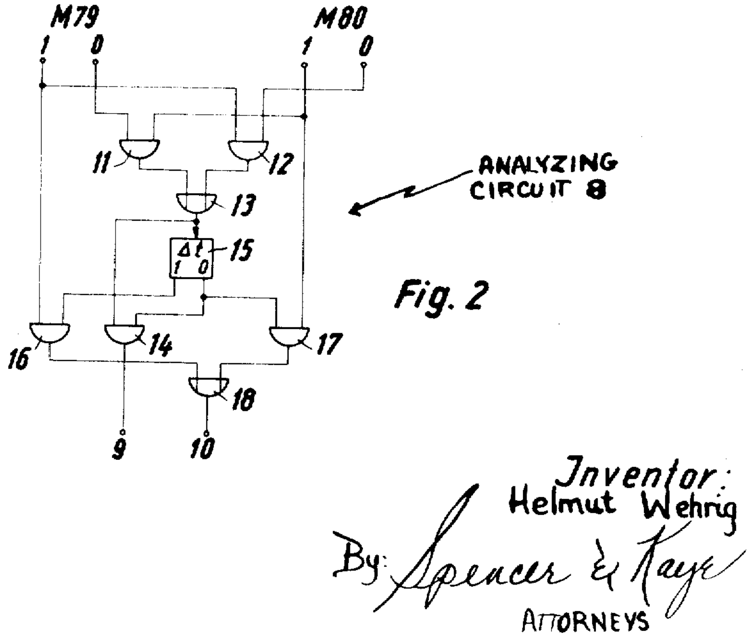
FIGURE 2 is a logic circuit showing the arrangement of one of the components forming part of the circuit of FIGURE 1.

FIGURE 2 shows such an analyzing circuit 8, using conventional symbols representing logic circuitry.

The signal "word boundary" is formed, essentially in an anti-coincidence circuit, comprising conjunctions, such as AND-circuits 11 and 12, and a disjunction, such as an OR-circuit 13, each conjunction having one input connected to each of M79 and M80 and the two inputs of the disjunction 13 being connected to the outputs of the two conjunctions. The output of disjunction 13 is applied, via a further conjunction 14, to output 9 if no boundary was determined to have been present during the immediately preceding transfer pulse. A single-pulse delay element 15 produces this condition by deriving its signal from the output of disjunction 13 and by having an output connected to another input of conjunction 14.

The signal "word is not to be processed," represented by a signal at output 10, is derived directly from the contents of mask register element M80 if no boundary was found to have been present during the previous transfer pulse, but is derived from M79 if such a boundary was determined to have been presented. This is accomplished by means of further conjunctions 16 and 17 and a disjunction 18.

Each thus-indicated transfer causes the unit 4 to store the information in a new word cell. Here it should be mentioned that the information on the punched card is so preserved in the buffer storage that, during read-out, it will always be the lowest digit of a number or the last letter of a text word which is first read into the unit. Thus, if a number is involved, the contents of column Z80 thus would have been applied to the lowest-order decimal place of the first word in the unit. Numbers will then continue to be read into the same word cell either until this word cell is full (in which case the unit switches over to the next word) or until the above-mentioned information word boundary interrupts the reading-in process. Any remaining places in the word cell of the unit are then filled with dummies, preferably with zeros of whatever number system is being used. A non-perforated column of the punched card causes a code-free tetrad, for example, a binary zero-tetrad in the excess-three code, to be stored.

Thus, if text characters (or text numbers or special characters) were fed in, the remaining positions of the word are filled with "zeros" after the appearance of an information word boundary. A text word is identified by "5" in the identifying sign place V of the word cell of the storage, while a number word is identified in the identifying sign place, by a "zero" in the excess-three code.

The following example illustrates the function of the mask register:

TABLE 1

| | Z1 | Z2 | Z3 | Z4 | Z5 | Z6 | Z7 | Z8 | Z9 | Z10 | Z11 | Z12 | Z13 | Z14 | Z15 | Z16 | Z17 | Z18 | Z19 | Z20 |
|---|---|---|---|---|---|---|---|---|---|---|---|---|---|---|---|---|---|---|---|---|
| Card | T | T | T | T | T | T | Z | Z | T | / | / | / | / | / | / | / | / | T | T | T |
| MR | 1 | 1 | 1 | 1 | 0 | 1 | 1 | 1 | 1 | 1 | 0 | 0 | 0 | 0 | 1 | 0 | 0 | 1 | 0 | 1 |
| 9 | 1 | 0 | 0 | 0 | 0 | 1 | 0 | 0 | 0 | 0 | 1 | 0 | 0 | 0 | 0 | 1 | 0 | 1 | 0 | 1 |
| 10 | 1 | 1 | 1 | 1 | 1 | 1 | 1 | 1 | 1 | 1 | 0 | 0 | 0 | 0 | 0 | 0 | 0 | 1 | 1 | 1 |

| | Z21 | Z22 | Z23 | Z24 | Z25 | Z26 | Z27 | Z28 | Z29 | Z30 | Z31 | Z32 | Z33 | Z34 | Z35 | Z36 | Z37 | Z38 | Z39 | Z40 |
|---|---|---|---|---|---|---|---|---|---|---|---|---|---|---|---|---|---|---|---|---|
| Card | T | / | / | / | / | Z | Z | / | Z | Z | Z | Z | T | T | T | / | / | T | / | Z |
| MR | 1 | 0 | 0 | 1 | 1 | 0 | 1 | 0 | 1 | 0 | 0 | 0 | 1 | 1 | 0 | 1 | 1 | 1 | 0 | 0 |
| 9 | 0 | 1 | 0 | 1 | 0 | 1 | 0 | 1 | 0 | 1 | 0 | 0 | 1 | 0 | 0 | 1 | 0 | 0 | 1 | 0 |
| 10 | 1 | 0 | 0 | 1 | 1 | 0 | 0 | 0 | 0 | 0 | 0 | 0 | 1 | 1 | 1 | 1 | 1 | 1 | 0 | 0 |

| | Z41 | Z42 | Z43 | Z44 | Z45 | Z46 | Z47 | Z48 | Z49 | Z50 | Z51 | Z52 | Z53 | Z54 | Z55 | Z56 | Z57 | Z58 | Z59 | Z60 |
|---|---|---|---|---|---|---|---|---|---|---|---|---|---|---|---|---|---|---|---|---|
| Card | / | / | / | / | / | / | / | / | / | / | T | T | T | Z | Z | Z | / | / | / | / |
| MR | 1 | 0 | 0 | 1 | 0 | 0 | 0 | 1 | 1 | 0 | 1 | 1 | 1 | 0 | 0 | 0 | 1 | 1 | 0 | 1 |
| 9 | 0 | 1 | 0 | 0 | 1 | 0 | 0 | 1 | 0 | 0 | 1 | 0 | 0 | 1 | 0 | 0 | 1 | 0 | 0 | 1 |
| 10 | 0 | 0 | 0 | 0 | 0 | 0 | 0 | 1 | 1 | 1 | 1 | 1 | 1 | 0 | 0 | 0 | 1 | 1 | 1 | 1 |

TABLE I—Continued

| | Z61 | Z62 | Z63 | Z64 | Z65 | Z66 | Z67 | Z68 | Z69 | Z70 | Z71 | Z72 | Z73 | Z74 | Z75 | Z76 | Z77 | Z78 | Z79 | Z80 |
|---|---|---|---|---|---|---|---|---|---|---|---|---|---|---|---|---|---|---|---|---|
| Card | / | / | T | / | / | T | T | / | / | / | / | / | / | / | Z | Z | Z | Z | Z | Z |
| MR | 1 | 0 | 1 | 1 | 0 | 1 | 1 | 1 | 0 | 0 | 1 | 0 | 0 | 1 | 0 | 0 | 1 | 0 | 0 | 0 |
| 9 | 0 | 0 | 1 | 0 | 0 | 1 | 0 | 0 | 1 | 0 | 0 | 1 | 0 | 0 | 1 | 0 | 0 | 1 | 0 | 0 |
| 10 | 1 | 1 | 1 | 1 | 1 | 1 | 1 | 1 | 0 | 0 | 0 | 0 | 0 | 0 | 0 | 0 | 0 | 0 | 0 | 0 |

The top line in above Table 1 represents the contents of a punched card. For the sake of simplicity, the table shows a T if the column represents a letter, a Z if the column represents a number, and if the column is empty, i.e., contains no perforation, this is shown by a slash (/). The second line in Table 1, labelled MR, shows the contents of the mask register 7, while the third and fourth lines, labelled 9 and 10, show the binary state of the outputs 9 and 10, respectively. Also to be mentioned is that the information words on the punched card must consist of at least two digits. If only single-digit words are to be used, two or more of these words are to be read into the unit as one word, correspondingly controlled by the mask.

TABLE 2.—DISTRIBUTION OF THE INFORMATION AMONG THE CELLS OF THE WORKING STORAGE OF THE DATA PROCESSING UNIT

| | V | D19 | D9 | D8 | D7 | D6 | D5 | D4 | D3 | D2 | D1 |
|---|---|---|---|---|---|---|---|---|---|---|---|
| 1st word | 0 | X | X | X | X | X | X | X | z | z | z |
| 2nd word | 0 | X | X | X | X | X | X | X | z | z | z |
| 3rd word | 0 | X | X | X | X | X | X | X | α | α | α |
| 4th word | 0 | X | X | X | X | X | X | X | α | α | α |
| 5th word | 5 | X | X | X | X | t | e | t | e | α | α |
| 6th word | 5 | X | X | X | X | t | e | α | α | α | α |
| 7th word | 5 | X | X | X | X | α | α | α | α | α | α |
| 8th word | 5 | X | X | X | X | α | α | α | α | α | α |
| 9th word | 0 | X | X | X | X | X | X | X | z | z | z |
| 10th word | 5 | X | X | X | X | t | e | t | e | t | e |
| 11th word | 5 | X | X | X | X | α | α | α | α | α | α |
| 12th word | 0 | X | X | X | X | X | X | X | α | α | α |
| 13th word | 0 | X | X | X | X | X | X | X | α | α | α |
| 14th word | 0 | X | X | X | X | X | X | X | α | z | α |
| 15th word | 5 | X | X | X | X | α | α | α | α | t | e |
| 16th word | 5 | X | X | X | X | t | e | t | e | t | e |
| 17th word | 0 | X | X | X | X | X | X | X | z | z | z |
| 18th word | 0 | X | X | X | X | X | X | X | X | α | z |
| 19th word | 0 | X | X | X | X | X | X | X | X | z | z |
| 20th word | 5 | X | X | X | X | X | X | α | α | α | α |
| 21st word | 0 | X | X | X | X | X | X | X | X | α | α |
| 22nd word | 5 | X | X | X | X | X | X | t | e | t | e |
| 23rd word | 5 | X | X | X | X | X | X | t | e | t | e |
| 24th word | 0 | X | X | X | X | X | X | X | X | α | α |
| 25th word | 0 | X | X | X | X | X | α | α | α | α | α |
| 26th word | 5 | t | e | 0 | z | 0 | z | t | e | α | α |
| 27th word | 5 | t | e | t | e | t | e | t | e | t | e |

*Legends of symbols used in Table 2*

*t*, *e*—Any text character in pseudo-alphameric code; it covers two number digits and is admissible only in text words.

*z*—Any number symbol which in text words always has a "0" set ahead of it in the excess-three code.

5—Identifying sign for a text word (is not processed).

0—Identifying sign for a number word (intended for processing).

α—Binary tetrad "zero"; the same identifies a non-perforated column. In the case of a text word, the binary tetrad zero appears twice for each non-perforated column of the punched card.

X—Dummy; the same can contain any information since it is always suppressed by the mask. For purposes of data processing, it is expedient to let the dummy appear as decimal "zero."

Table 2 shows the distribution of the information among the cells of the working storage of the data processing unit when the punched card information appearing in the first line of Table 1 is applied to the data processing unit with the help of the mask. The feed-in begins with the lowest-order position of the punched card, this being, in Table 1, the column Z80 at the very right. All that is done at the start of the read-in process is to determine whether the character is a number ("no signal" via output 10) or a text ("signal" via output 10). In the example, the character is a number. Consequently, only the positions E1 to E4 are read out from the input register and this is applied to the last decimal digit of the first word cell. No signal appears at output 9.

The contents of the buffer storage and of the mask register is now shifted rightwardly by one digit. There thus appears, at the two test positions, the combination 00, which, as explained above, is indicative of the fact that no word boundary has as yet appeared, so that the character is to be continued to be treated as a number. The second number *z* thus reaches the second digit of the first word cell.

During the next step, the column Z78 is still treated as a number and is stored in the first word cell, but the input process is immediately interrupted. The remaining seven decimal digits are then filled with the dummy or filler tetrad, e.g., the number zero, and the digit in position V, representing the identifying sign, is set to 0. The computer now switches over to the next word cell and continues the input process in that it recognizes the symbol in column Z77 as being a number and applies the same to the lowest-order digit of the second word cell. In the example, the information on the card is shown to have been divided into 27 information words, which are therefore read into 27 word cells of the computer, as shown in Table 2. The rest of the input process will readily be discernible from Table 2.

After the contents of the input buffer storage has been read in, the 27 information words in the punched card are available in 27 word cells of the computer (Table 2). The programmer knows at once, on the basis of the mask which has been put in (this mask can be freely selected by the programmer) in which word cells what information is to be found. The processing of the contents on the punched card can therefore be started immediately. All re-coding and rearranging processes are eliminated.

The transmission of the 27 information words of the punched card to the input buffer storage in the data processing system requires only 27 so-called word-times, if there is an automatic control system by means of which the continuous transmission is applied to consecutive word cells in the working storage. The time required for this is very small, even in the case of relatively slow data processing systems, as compared to the time which is required for filling the input buffer storage from the punched card equipment. This means that the data processing system can continue to work its program throughout the time during which the input buffer storage is being filled, e.g., the information just fed in from the punched card can be processed.

The above concerns itself mainly with the mask and the function thereof during the reading of information from the punched card to the buffer storage. But since, in general, punched cards are fed which have different meanings, i.e., in which the information words in the various columns are to be valued differently, the data processing unit has to determine, prior to the reading in of the information on the card, just what type of information is involved, so that the proper mask can then be put into the mask register. This mask is then selected, or read out, on the basis of identifying numbers of the punched card in the last columns, e.g. columns 79 and 80 (Z79, Z80). This prior testing of the punched card is done as follows: The program puts out the command "read 2 characters," as a result, only the columns Z80 and Z79 are applied to the data processing unit via the coder and the input register. This deactivates the analyzing circuit and the unit is automatically switched to number input. The then applied two numbers are tested in the unit and serve as a criterion for the subsequent output of the mask. In this way, up to 100 different types of punched cards can be identified. After the mask has been put out, the program puts out the command "read all characters." As a result, all of the remaining 78 characters are applied to the data processing unit, in the manner described above, by using the contents of the mask register.

If, prior to the reading in, the program did not give the command "read 2 characters," the data processing unit will, at the actual read-in command, receive all 80 characters of the punched card, with the aid of whatever contents there be in the mask register. There is no objection to the omission of such a command provided only one type of punched card is to be processed, or if the sequence and number of the different types of punched cards is known. Therefore, in order to preserve the mask, the mask is connected to a shifting register.

The operations for setting the mask register require 2 to 8 word-times, depending on the organization of the program. The time required is thus relatively small and, in practice, does not significantly reduce the speed at which the information on the punched card is read into the data processing unit.

The output of information from the storage of the data processing unit into the buffer storage takes place in the same manner. Since the program takes into consideration the type of information, the correct mask can immediately be applied to the mask register. A subsequent read-out command sees to it that the information in the data processing unit storage is applied to the buffer storage; on the basis of the contents of the mask register, dummy fillers and the identifying sign digits can be omitted so that only that information which is actually desired is punched on the card.

The manner of the read-out can be best understood when the previously applied information which was distributed into the storage is again read out with the help of the same mask. The last three numbers (*zzz*) of the first word appear in Z78 to Z80 of the buffer storage. The analyzing circuit then makes a determination as to whether the end or boundary of a word has been reached, as a result of which the read-out process is interrupted until the appearance of the 2nd word, or, more accurately, the last number *z* of the 2nd word.

It has been assumed, in the foregoing explanation, that the mask storage was filled by the transmission of the contents of a read-out storage cell of the main storage of the data processing unit. Instead, the contents of the buffer storage, which is scanned simultaneously with the mask register (mask storage) could be contained, together with a further mask, in a separate storage or in a portion of the data storage. From this it will be appreciated that the present invention lends itself to a number of further modifications. In particular, it is pointed out that the present invention is not limited to an arrangement in which precisely two characters are applied to the analyzing circuit, or to an arrangement in which the card punch and the card reader use the same buffer storage. Instead, the invention is applicable to an arrangement using different read-out and punch devices.

Nor is the invention limited to the use of punched cards in which the information is stored mechanically, but is equally applicable to any type of cards which carry information. As already stated above, the invention can be used in conjunction with cards in which the information is stored magnetically.

Nor is the invention limited to the transmission of only positive or only negative numbers. Instead, the identifying sign can be an algebraic sign which is encoded in the identifying sign digit V, particularly in the case of decimal representation where still further tetrad combinations remain unused. Also, the information words may be special characters which are properly encoded to convey the desired meaning.

According to a further feature of the present invention, non-binary masks can be used, e.g., masks in which the individual digital positions are presented decimally. It is then enough if only one digit of the mask register is analyzed in order to obtain a determination about the presence of a word boundary as well as a processing instruction. While this entails a somewhat more complicated mask register, this is more than compensated for by the fact that the analyzing circuit is simplified and that in a purely decimal data processing unit no purely binary values appear.

It will be understood that the above description of the present invention is susceptible to various modifications, changes, and adaptations, and the same are intended to be comprehended within the meaning and range of equivalents of the appended claims.

What is claimed is:

1. An arrangement for transmitting data from a card reader to a data processing unit or from such a unit to a card writer, wherein each card is capable of storing a plurality of information words, each of which words consists of a plurality of characters which are transmitted serially, said arrangement comprising, in combination:

(a) a mask register having as many digital positions as each card to be used with the arrangement has characters;

(b) means for serially reading out the mask register in synchronism with said serial transmission of characters commencing with the first character of a group of characters corresponding to one card and ending with the last character thereof; and (c) digital analyzing means coupled to at least one digital position of said mask register for identifying word boundaries between adjacent characters of said group of characters while they are being transmitted.

2. The combination defined in claim 1 wherein said analyzing means include means for distinguishing between words which are to be processed by the data processing unit from words which are not to be processed by the unit.

3. The combination defined in claim 1 wherein the data processing unit includes a storage having a plurality of cells and wherein means are provided for feeding said mask register from a cell which is determined by at least the first of the transmitted characters.

4. The combination defined in claim 1 wherein said mask register has positions each of which contains a number of a number system to a base greater than 2, and wherein said analyzing means are connected to analyze that position of said mask register the corresponding character of which is being transmitted.

5. The combination defined in claim 1 wherein the card reader or writer includes a buffer storage for temporarily storing the contents of the card.

6. The combination defined in claim 5 wherein the card reader or writer contains a coder.

7. The combination defined in claim 5 wherein the card reader or writer contains a code tester.

8. The combination defined in claim 1 wherein said mask register is a part of the storage of the data processing unit.

9. An arrangement for transmitting data from a card reader to a data processing unit or from such a unit to a card writer, wherein each card is capable of storing a plurality of information words, each of which words consists of a plurality of characters which are transmitted serially, and wherein two word boundaries are spaced from each other by at least two characters, said arrangement comprising, in combination:

(a) a mask register having as many binary positions as each card to be used with the arrangement has characters;

(b) means for reading out said mask register in synchronism with the character transmission; and (c) means for analyzing two binary positions of said mask register for identifying a word boundary between two characters being transmitted, said analyzing means including means for applying a signal "word boundary" to the data processing unit when two consecutive mask register positions are in different binary states and when no word boundary was identified in the immediately preceding step, and for applying a signal "word is not to be processed" when the second mask register position following a word boundary has a given binary state.

10. The combination defined in claim 9, including means operative upon the appearance of a signal "word boundary" for causing the address of the storage cell of the data processing unit being treated to be changed.

11. The combination defined in claim 9, including means operative during reading in of a card into the data processing unit and dependent on the signal "word is not to be processed" for causing an identifying character to be applied to an identifying position of the storage cell being treated, and for filling free storage places in said cell with dummies after the appearance of the word boundary.

12. In an arrangement for transmitting data, in a manner suitable for processing such data, from a card reader to a data processing unit, or from such a unit to a card writer, wherein each card is divided into a plurality of regions each of which is capable of storing one information word each of which words consists of a plurality of characters which are transmitted serially, the improvement which comprises a mask register having as many digital positions as the card has characters, means for serially reading out the mask register in synchronism with said serial transmission of characters commencing with the first character of a group of characters corresponding to one card and ending with the last character thereof; and digital analyzing means coupled to at least one digital position of said mask register for identifying word boundaries between adjacent characters of said group of characters while they are being transmitted.

13. The improvement defined in claim 12 wherein said analyzing means comprise logic circuit means connected to the last two digital positions of said mask register.

14. A circuit arrangement for use with cards each of which is capable of storing a plurality of information words each of which words consists of a plurality of characters, said circuit arrangement comprising, in combination:

(1) a buffer storage;

(2) coder means connected to said buffer storage;

(3) transfer register means connected to said coder means;

(4) a data processing unit connected to said transfer register means;

(5) a mask register having a shifting input and a plurality of positions corresponding in number to the number of characters capable of being stored in the cards used with the circuit arrangement, said shifting input being connected to have a pulse applied thereto in synchronism with the read-out of a group of characters corresponding to one card from said buffer storage; and (6) analyzing means connected to at least one of said positions of said mask register for applying to said data processing unit a signal identifying a word boundary between two characters of said group of characters.

15. A circuit arrangement as defined in claim 14 wherein each position of said mask register is a binary digital position, and wherein two word boundaries are spaced from each other by at least two characters, and wherein said analyzing means are connected to two consecutive masking register positions for applying to said data processing unit a signal "word boundary" when said two consecutive masking register positions are in different binary states and no word boundary was identified in the preceding step, and for applying to said data processing unit a signal "word is not to be processed" when the second mask register position following a word boundary has a given binary state.

16. A circuit arrangement as defined in claim 15 wherein said analyzing means have first and second outputs at which said signals "word boundary" and "word is not to be processed," respectively, appear.

17. A circuit arrangement as defined in claim 16 wherein said analyzing means comprise first and second AND-circuits each having one input connected to each of said two consecutive masking register positions; a first OR-circuit having two inputs connected, respectively, to the outputs of said first and second AND-circuits; a one-pulse time delay element connected to the output of said first OR-circuit; a third AND-circuit having one input connected to the output of said first OR-circuit and a second input connected to the output of said time delay element, the output of said third AND-circuit being said first output of said analyzing means; a fourth AND-circuit having one input connected to one of said two consecutive register positions and a second input connected to the output of said time delay element; a fifth AND-circuit having one input connected to the other of said two consecutive register positions and a second input connected to the output of said time delay element; and a second OR-circuit having two inputs connected, respectively, to the outputs of said fourth and fifth AND-circuits, the output of said second OR-circuit being said second output of said analyzing means.

References Cited

UNITED STATES PATENTS

| | | | |
|---|---|---|---|
| 3,000,556 | 9/1961 | Bewley et al. | 235—61.6 |
| 3,072,328 | 1/1963 | Bewley et al. | 235—61.1 |
| 3,119,098 | 1/1964 | Meade | 340—172.5 |
| 3,235,848 | 2/1966 | King et al. | 340—172.5 |

ROBERT C. BAILEY, *Primary Examiner.*

R. M. RICKERT, *Assistant Examiner.*